(12) United States Patent
Barr

(10) Patent No.: US 7,784,236 B2
(45) Date of Patent: Aug. 31, 2010

(54) MULTI-LAYER COVERING

(76) Inventor: Owen Derek Barr, PO Box 1173, Gosford, NSW (AU) 2250

( * ) Notice: Subject to any disclaimer, the term of this patent is extended or adjusted under 35 U.S.C. 154(b) by 972 days.

(21) Appl. No.: 10/563,026

(22) PCT Filed: Jul. 5, 2004

(86) PCT No.: PCT/AU2004/000887
§ 371 (c)(1),
(2), (4) Date: Dec. 30, 2005

(87) PCT Pub. No.: WO2005/003486
PCT Pub. Date: Jan. 13, 2005

(65) Prior Publication Data
US 2006/0174585 A1    Aug. 10, 2006

(30) Foreign Application Priority Data

| Jul. 3, 2003 | (AU) | ............................ | 2003903384 |
| Aug. 12, 2003 | (AU) | ............................ | 2003904247 |
| Sep. 18, 2003 | (AU) | ............................ | 2003905091 |
| Mar. 12, 2004 | (AU) | ............................ | 2004901276 |

(51) Int. Cl.
*E04F 13/077* (2006.01)
(52) U.S. Cl. .................. 52/454; 52/408; 52/514.5; 52/746.1
(58) Field of Classification Search ............ 52/309.8, 52/309.13, 403.1, 406.1, 406.2, 344, 791.1, 52/514.5, 411, 408, 446, 454, 449, 506.1, 52/796.1, 746.1, 741.41, 662, 255, 287.1; 428/137, 139; 156/71
See application file for complete search history.

(56) References Cited

U.S. PATENT DOCUMENTS 3,466,222 A * 9/1969 Curtis ..................... 428/142
3,795,180 A * 3/1974 Larsen ..................... 405/36

(Continued)

FOREIGN PATENT DOCUMENTS

DE          2225358          12/1972

(Continued)

OTHER PUBLICATIONS

Supplemental European Search Report dated May 20, 2009 from European Appln. No. 04737508, 2 pages.

*Primary Examiner*—Robert J Canfield
*Assistant Examiner*—Christine T Cajilig
(74) *Attorney, Agent, or Firm*—Boyle Fredickson, S.C.

(57) ABSTRACT

A multi-layer covering includes a flexible fabric layer. The fabric layer may be a fluffy blanket or a mesh. The multi-layer covering further includes a metallic reflective foil (or paper) support layer, and a layer of adhesive protected by a peel-off backing layer for ease of applying the covering to a surface. When covering a wall, the covering is stuck to the wall and one or more protective coatings of paint render such as acrylic are applied to the blanket with a brush or roller or spray. The blanket provides an even surface when coated with render paint and avoids the need for extensive preparation of the wall. The covering may also be applied to floors, ceilings and roofs and covered with differing coatings, including acrylic render, plaster, paint, glue, and other surface treatments. The covering may be used to cover cracks and undulations in buildings and other structures.

22 Claims, 3 Drawing Sheets

U.S. PATENT DOCUMENTS

| | | | | |
|---|---|---|---|---|
| 4,135,017 A | * | 1/1979 | Hoffmann, Sr. | 428/78 |
| 4,310,587 A | * | 1/1982 | Beaupre | 442/31 |
| 4,315,392 A | * | 2/1982 | Sylvest | 52/309.1 |
| 4,328,652 A | * | 5/1982 | Naumovich, Jr. | 52/408 |
| 4,557,092 A | * | 12/1985 | Brueske | 52/404.1 |
| 4,784,891 A | * | 11/1988 | Shickel | 428/137 |
| 4,841,705 A | * | 6/1989 | Fuhrer | 52/410 |
| 4,902,550 A | * | 2/1990 | Shickel | 428/137 |
| 5,052,161 A | * | 10/1991 | Whitacre | 52/385 |
| 5,346,565 A | * | 9/1994 | White | 156/71 |
| 5,620,768 A | * | 4/1997 | Hoffmann, Sr. | 428/77 |
| 5,697,195 A | * | 12/1997 | Maylon | 52/344 |
| 5,766,721 A | * | 6/1998 | Bussey et al. | 428/71 |
| 5,820,958 A | * | 10/1998 | Swallow | 428/42.2 |
| 6,123,172 A | * | 9/2000 | Byrd et al. | 181/290 |
| 6,151,854 A | * | 11/2000 | Gutjahr | 52/385 |
| 6,167,668 B1 | | 1/2001 | Fine et al. | |

FOREIGN PATENT DOCUMENTS

| | | |
|---|---|---|
| DE | 296 04 916 U1 | 8/1997 |
| EP | 0 386 324 B1 | 9/1990 |
| FR | 2 253 131 | 6/1975 |
| GB | 2 245 607 A | 1/1992 |
| GB | 2256605 | 12/1992 |
| JP | 2001-012002 | 1/2001 |
| SE | CH 602968 * | 12/1977 |
| WO | WO 97/06317 | 2/1997 |
| WO | WO 01/92618 | 12/2001 |

* cited by examiner

MULTI-LAYER COVERING

This application is a 371 National Phase filing of PCT/AU2004/000887 filed Jul. 5, 2004 which claims priority to Australia Patent Application No. 2003903384, filed Jul. 3, 2003; and to Australian Patent Application No. 2003904247, filed Aug. 12, 2003; and to Australia Patent Application No. 2003905091, filed Sep. 18, 2003; and to Australian Patent Application No. 2004901276, filed Mar. 12, 2004, all of which applications are incorporated herein by reference.

FIELD OF THE INVENTION

This invention relates to a multi-layer covering and in particular to a covering for a wall, ceiling floor, roof or the like of a building or other structure. The invention also relates to a method for covering a wall, ceiling, floor, roof or the like by applying a covering to the wall, ceiling, floor, roof or the like.

BACKGROUND OF THE INVENTION

It is known to those who are familiar in the art that cracks and undulations of surfaces appear in buildings and structures at the outset of the building process due to poor workmanship, and later, once the building so to move and settle, cracks appear due to movement of base materials and framework. It is known to improve the integrity of existing buildings by filling cracks in the walls, or ceilings of the building and apply render. However, for the most part, exiting methods for treating buildings by rendering them or the like, are time consuming, require extensive preparation and are generally only suitable for application by skilled tradespersons. Consequently, existing wall and ceiling treatment and rendering systems are expensive and unsuitable for unskilled and semi-skilled home renovators.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In a first aspect of the present invention, there is provided a method of treating a wall, floor, roof, or ceiling, comprising the step of:

applying a flexible fabric layer to the wall, the fabric layer being selected from the group consisting of:

a blanket having a thickness of 2 mm to 20 mm, the blanket being made from fibre strands formed either as a weave or being non-woven, and defining gaps between the strands or in the blanket, or in the form of a batt having holes punched therethrough; and a flexible mesh layer having a spacing between strands of the mesh of 5 mm to 20 mm; and the step of applying one or more coatings to the fabric layer.

The invention provides a flexible strong webbing that will support an outer coating and assist in the covering of cracks and undulations to achieve an acceptable surface. Both the coating and the covering should have the same degree of flexibility as each other and a similar amount of movement as the movement of the building structure, within a certain range of movement. Provided that these cracks and undulations are no more than 10 mm and preferably less than 3 mm, the covering may stretch across those cracks and gaps. The bridging of the cracks and gaps saves time and costs during construction, and later when movement of the structure creates gaps and cracks, the covering assists in the covering of these unsightly cracks and undulations. This covering also prevents weather entering the building through the cracks and prevents the build up of dust and mildew in these cracks which if left unattended could become a heath hazard. The fabric will cover most cracks undulations and imperfections in the wall, floor, or ceiling. It will also act as a matrix for absorbing the coating which may be paint, acrylic paint render or the like In a particular related aspect the present invention, there is provided a method of treating a wall, floor, roof, or ceiling comprising the steps of:

applying a flexible fluffy blanket layer to the wall, the blanket having a thickness of 2 mm to 20 mm, the blanket being made from fibre strands formed either as a weave or being nonwoven, and defining gaps between the strands or in the blanket, or in the form of a batt having holes punched therethrough; and applying one or more coatings to the blanket.

In a preferred embodiment, the thickness of the blanket is in the range of 2 mm to 5 mm.

The term non-woven blanket encompasses any non-woven blanket made from fibres including batts and spun bonded blankets.

On one embodiment the blanket is woven and the gaps between adjacent fibres of the blanket range from 0.3 mm to 3 mm, most preferably 0.6 mm to 3 mm.

In an alternative embodiment the blanket is a batt or is spun bonded and through holes having a diameter of 0.3 mm to 3 mm, most preferably 0.6 mm to 3 mm, are formed in the batt or spun bonded blanket.

In the case where a wall, particularly an external wall, is being covered, the protective coating will typically be a render paint such as an acrylic render paint and will be applied with a brush or roller or spray. Other paints could be used including oil based paints, lime-wash renders and the like. The type of render paint utilised will depend on the characteristics of the blanket layer. Acrylic render typically includes a relatively thick mixture of cement, sand and acrylic polymer, although renders other than cement and sand may be used. The render provides "body" in the render paint and allows persons applying the render paint to vary the appearance of the external surface as well as providing protection for the weather and a vehicle to provide color to the overall coating. The acrylic polymer acts as a sort of "glue" and assists in holding the render together. Typically, the sand/cement particles in the acrylic render have a diameter from 0.06 mm to 0.2 mm. The sand and cement particles penetrate into the gaps between the fibres of the blanket or the holes in the batt as far as the face of the wall and saturate the blanket with acrylic render paint. The blanket also provides a protective and supporting surface when coated with render paint.

The holes in the blanket must be sufficiently large to allow water to readily drain out of the blanket as well as allowing relatively free flow of the coarser materials of the acrylic render paint through the blanket at the time of application, but form a support matrix for the acrylic render paint once it dries and sets.

The weave or batt is preferably resilient and stretchable. A supporting backing layer of building paper or strong metallic reflective foil may be provided for strengthening the blanket.

The metallic reflective foil or paper supporting layer is preferably coated with an adhesive protected by a peel-off protective layer to make the covering easy to apply.

The fibres of the blanket are preferably corrosion resistant and hydrophobic and resistant to ultraviolet radiation, and resistant to most chemical solvents, mineral turps, kerosene, petrol, detergents and paint thinners.

Acrylic paint renders are sold with varying percentages of acrylic polymer with the cheaper renders containing less acrylic polymer. Advantageously, by providing a blanket which acts as a matrix for the render, relatively cheaper acrylic render paints with less acrylic polymer can be used. The blanket's function in this case is to provide additional flexible support structure and bonding between the outer coating of render and the supporting metallic reflective foil or paper layer.

Where the method is used for covering ceilings, relatively thinner blankets are used typically having a thickness of 2 mm to 10 mm, most preferably around 2 mm to 5 mm, and the blanket may simply be coated in a standard paint, such as an acrylic paint.

The method may also be used on floors in which case the peel off layer is removed and the metallic reflective foil layer stuck to the existing floor surface. The blanket can then be coated in grout, tiling cement, adhesive or the like depending on the type of floor finish required and will absorb some of the coating and provide a bond between the floor finish and the metallic reflective foil. The metallic reflexive foil layer provides heat insulation. The blanket provides both heat and sound insulation.

The invention also provides a covering for application to a wall ceiling, floor or roof of a building or like struggle comprising a fabric layer selected from the group of fabrics layers consisting of:
 a stretchable strong blanket which may be woven or non woven or in the form of a batt having holes punched therethrough, and which is preferably non corrosive for application to exterior or interior building walls; and
 a flexible mesh layer having a spacing between strands of 5 mm to 20 mm.

In a particular related aspect, the invention also provides a covering for application to a wall ceiling, floor or roof of a building or other structure or the like comprising a stretchable strong blanket which may be woven or non woven or in the form of a batt having holes punched therethrough, and which is preferably non corrosive for application to exterior or interior building walls roofs ceilings floors or the like.

Where the fabric is a blanket, it is preferred that the blanket layer is from 2 mm to 20 mm in thickness, most preferably 2 mm to 5 mm thick. The blanket is preferably made from a plastics material most typically fibre glass or recycled PET fibres and the gaps between the fibres are 0.3 mm to 3 mm, most preferably 0.6 mm to 3 mm and are large enough so that the sand and cement particles of the acrylic cement render paint will pass through the gaps.

Typically, a support layer may be fixed to the blanket which could be a layer of building paper or most preferably a strong metallic reflective foil.

Preferably, one side of the laminate for attachment to a wall or the like is coated with a strong adhesive layer which is protected by a peel off layer to cover a protected adhesive prior to the application of the blanket to a wall, ceiling, floor or roof or the like.

The covering may be used in roofing applications as a wrap covering the roof structure and associated members and particularly over outer planar surfaces before the application of an external roof cladding material, in which case the preferred thickness is 5 to 10 mm. The roof covering may be quickly and safely applied to the roof structure using the self-adhesive layer. The blanket layer will absorb the glue which in turn gives a strong flexible adhesive to permit bonding onto the outer roof cladding material. In addition, the external roof cladding material may be fixed to the base layer using screws or the like. The blanket and foil provide sound and heat insulation.

In a further related aspect of the present invention, there is provided a method of treating a wall, ceiling floor or roof comprising the steps of applying a flexible mesh layer to the wall ceiling floor or roof having a spacing between strands of 5 mm to 20 mm; and
 applying one or more protective coatings to the mesh.

Preferably the mesh includes a backing layer which may typically be metallic reflective foil or paper.

The backing layer may be coated with an adhesive cover in a peel-off protective layer for ease of application of the mesh layer to the wall, ceiling floor or roof.

The mesh may have a thickness of 1 to 4 mm, most typically 1 to 2 mm.

In a related aspect, the present invention also provides a covering material for walls, ceilings roofs or floors comprising:
 a flexible mesh layer having a spacing between strands of the mesh of 5 mm to 20 mm;
 a reflective metallic foil backing layer;
 a layer of adhesive applied to the foil backing layer; and
 a removable protective layer covering the adhesive.

Preferably the spacing between the strands of mesh is 5 mm to 10 mm.

Typically the mesh has a thickness of 1 to 4 mm, most typically 1 to 2 mm

BRIEF DESCRIPTION OF THE DRAWINGS

A specific embodiment of the invention will now be described by way of example only and with reference to the accompanying drawings in which.

DETAILED DESCRIPTION OF A PREFERRED EMBODIMENT

Figure 1:
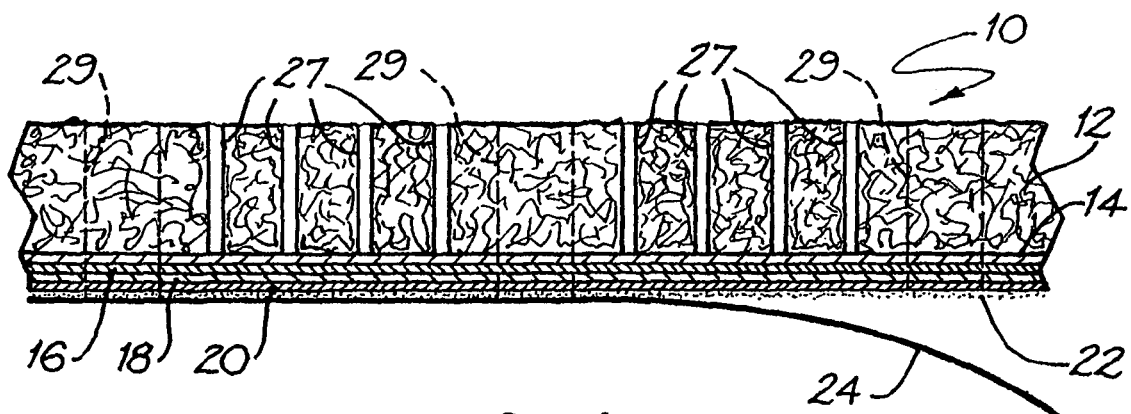
FIG. 1 shows a first embodiment of a covering/wrap

Referring to the drawings FIG. 1 shows a multi-layer covering 10 comprising a first layer of a fabric which in the particular embodiment is a fluffy blanket 12 having a thickness of 2 to 4 mm, but which could, as described below, also be a mesh. The blanket is typically made of woven fibre glass but may be woven from other plastic materials, including recycled plastics such as recycled PET. The blanket may also be a batt or other unwoven matted plastic matrix, including a spun-bonded layer, or other suitable non-corrosive, non-toxic, flexible material resistant to radiation, ultra-violet, rays, most commercial solvents, (including mineral turpentine, kerosene, petrol, detergents, and paint thinners and the like).

Where a woven blanket, or non-woven blanket such as a spun bonded layer, is used the gaps between the fibres in the weave are generally between 0.3 mm to 3.0 mm and preferably between 0.6 mm and 3.0 mm. Where a batt or the like is used a matrix of closely spaced "particle holes" 27 having a diameter of from 0.3 mm to 3 mm, most preferably 0.6 mm to 3 mm may be punched trough the batt.

Fixed to one side of the blanket by adhesive or any other suitable means is a building paper backing layer 14. Fixed to that layer is a foil multilayer comprising two layers of metallic reflective foil 16 and 20 sandwiching a layer of paper 18. In other embodiments a single layer of metallic reflective foil may substitute for the foil multilayer and, as shown in FIG. 2, the building paper backing layer and the foil multilayer may be substituted by a single strong metallic reflective foil layer 20.

A layer of adhesive 22 coats the opposite face of the foil layer 20 and this is protected by a peel-off protective backing layer 24.

Figure 1A:
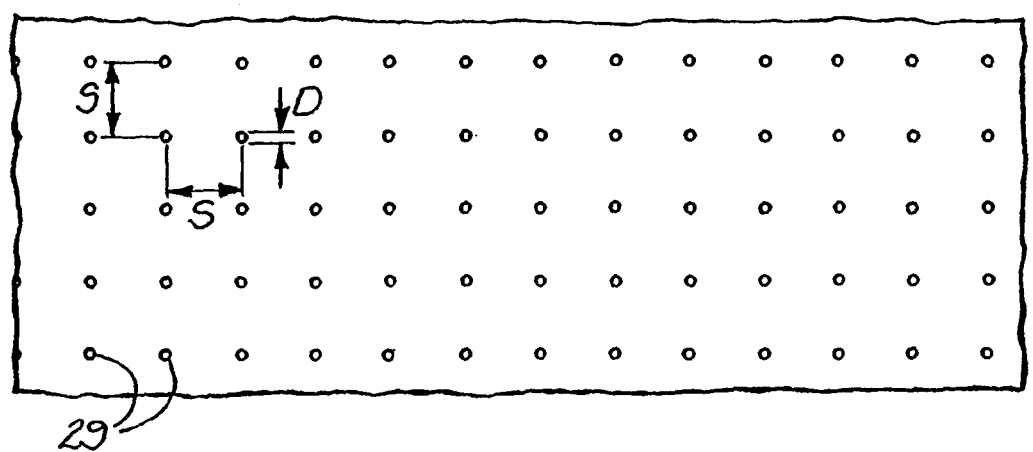
FIG. 1a is a plan view of the embodiment of FIG. 1.

With reference to FIGS. 1 and 1a in particular, a rectangular or square pattern or grid of blister holes 29 is punched through the layers 12, 16, 18, 20, 22 and 24. The holes need not extend through the peel-off layer 24, but typically will. The diameter D of the holes is generally from 0.5 mm to 10 mm but preferably 1 mm to 5 mm. Generally the spacing between the holes may be 10 mm to 300 mm but the preferred spacing between the blister holes is 10 mm to 50 mm. The holes allow air to escape turning application of the covering and provide an economical guide line between the holes for on site cutting to match an adjacent covering layer.

Figure 2:
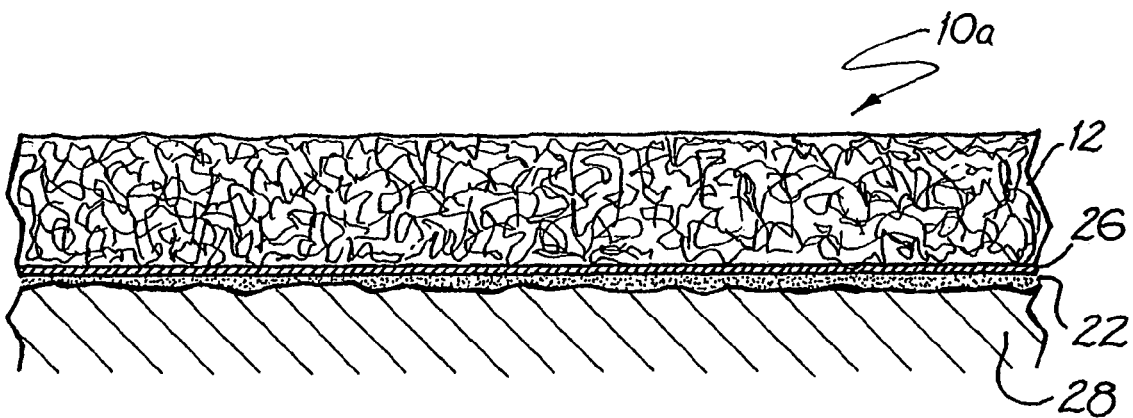
FIG. 2 shows a second embodiment of a covering/wrap, being a variant of the first embodiment, applied to a wall.

FIG. 2 shows an alternative embodiment of covering 10a in which the blanket 12 is attached by adhesive, or other suitable means, to a single strong metallic reflective foil layer 26, the reverse face of the wall covering being coated in a layer of adhesive 22, covered by a peel-off protective layer, not shown in FIG. 2 which illustrates the covering attached to a wall, after the peel-off protective layer has been removed.

In a first use, the covering of FIGS. 1 and 2 can be applied to relatively uneven and poorly prepared wall surfaces 28 of buildings and other structures by "handy-persons", DIY enthusiasts and persons without trades skills. The peel-off protective layer is removed and the covering is simply stuck to the wall. The covering will cover cracks and undulations.

However, although the covering may be applied to poorly prepared wall surfaces, it is preferred that at least a clean surface without grease or salts is provided. For best results surface pre-treatments create a clean surface that will make a clean strong bond with the adhesive 22 of the covering. Preferably also existing gaps and cracks such as cracks and joints between bricks are filled. The covering may be applied to walls in a similar manner to wallpaper. The edges of abutting sheets of wall covering, once applied to a wall, may be interwoven or other wise joined together. One way of achieving this is to have the outer blanket 4 mm wider than the metallic reflective foil layer/building paper, overlapping by 2 mm each side. The overlap will provide an interwining of blanket fibres that can be combed together after the blanket is applied to the surface. This overlapping will protect the covering during transportation and handling. Any off-cuts may be used for patching up work or the like.

Next a protective coating in the form of a render paint such as an acrylic render paint is applied with a brush or roller or spray nozzle. Acrylic render paint includes a relatively thick mixture of cement, sand and acrylic polymer. The cement and sand provide "body" in the render and allow persons applying the render to vary the appearance of the external surface as well as providing protection for the weather and a vehicle to provide colour to the overall coating. The acrylic polymer acts as a sort of "glue" and assists in cementing the render together. Typically, the sand/cement particles in the acrylic render have a diameter from 0.06 mm to 0.2 mm. The coarse sand and cement particles penetrate into the gaps between the fibres of the blanket or the holes in the batt as far as the face of the wall and together with the acrylic render paint saturate the blanket with acrylic render paint. The blanket also provides an even surface when coated with render paint covering up imperfections in the underlying wall.

The holes in the blanket must be sufficiently large to allow water to readily drain out of the blanket as well as allowing relatively free flow of the coarser materials of the acrylic render paint through the blanket during the process of applying the render.

The coating may be applied intermittently and does not need to be applied as soon as the covering has been applied to the wall since the covering will allow water to drain out, and the covering is weatherproof for a short duration, typically about seven days.

When used for a wall the covering 10a has a preferred thickness of 2 to 20 mm, most preferably 2 to 5 mm, and the gaps in the blanket are 0.3 mm to 3 mm, most preferably 0.6 mm to 3 mm.

The blanket covers undulations and cracks in the wall and provides a smooth outer wall surface with minimum effort.

Figure 3:
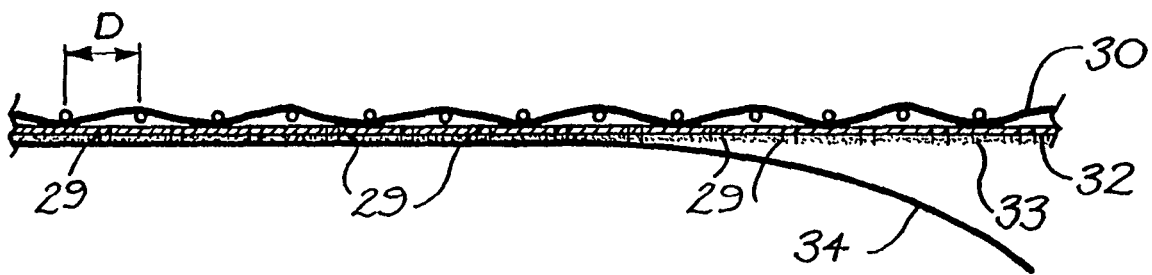
FIG. 3 shows a third embodiment of a covering/wrap
Figure 3A:
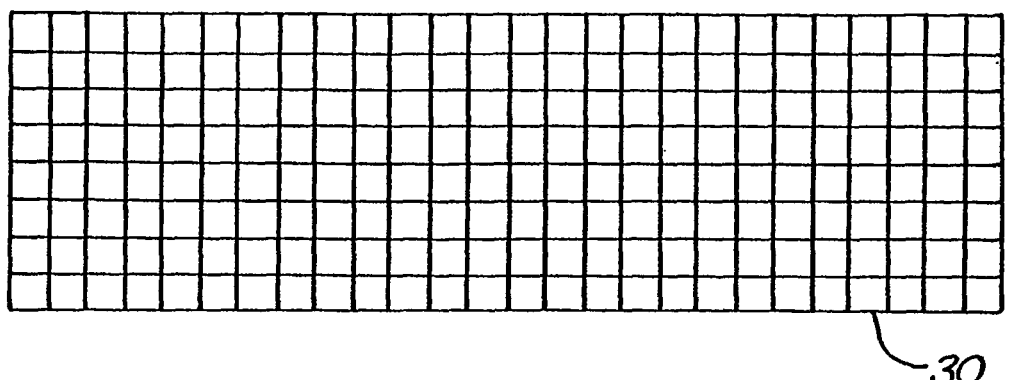
FIG. 3a is a plan view of the embodiment of FIG. 3.
Figure 4:
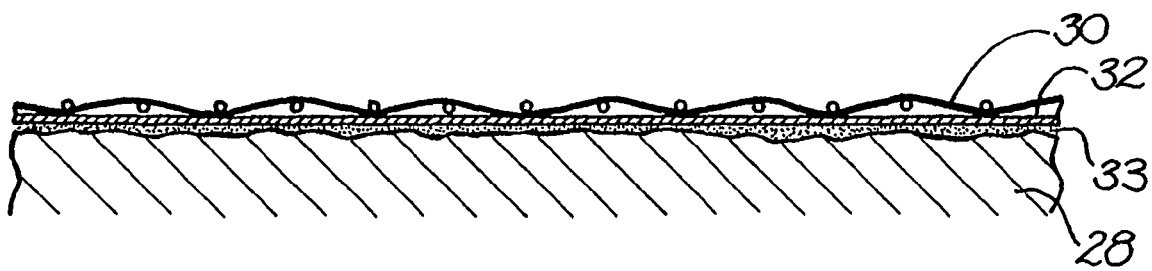
FIG. 4 shows the third embodiment applied to a wall of a building.

FIG. 3 shows a further embodiment in which the fabric layer comprises a mesh 30 of fibre strands in a grid formation of square openings (but which could be other shapes) having a width of 5 mm to 20 mm, most preferably 5 mm to 10 mm. FIG. 3a is a plan view of the mesh 30. A support layer of metallic reflective foil 32 is fixed to the mesh. The foil is coated with an adhesive layer 33, which is protected by a peel-off protective layer 34. In one less-preferred embodiment the foil may be replaced with a strong paper such as building paper. Again, blister holes 29 extend through the layers 32, 33, 34.

The covering may be applied to a wall and coated with a render paint such as an acrylic reader paint. The meshes having openings of a size of 5 mm to 10 mm less expensive acrylic render paint. Meshes having openings of 10 mm to 20 mm require more expensive acrylic render.

Figure 5:
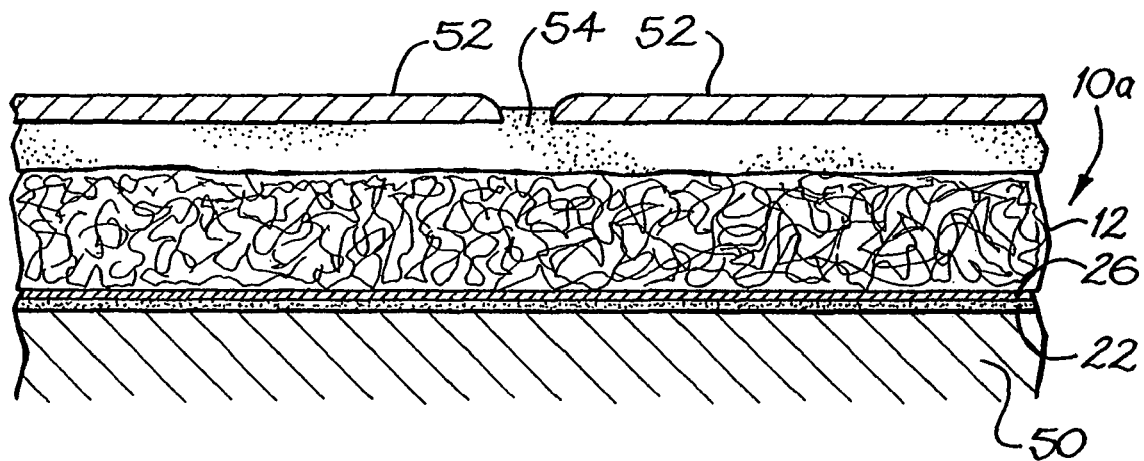
FIG. 5 shows the second embodiment applied to a floor.
Figure 6:
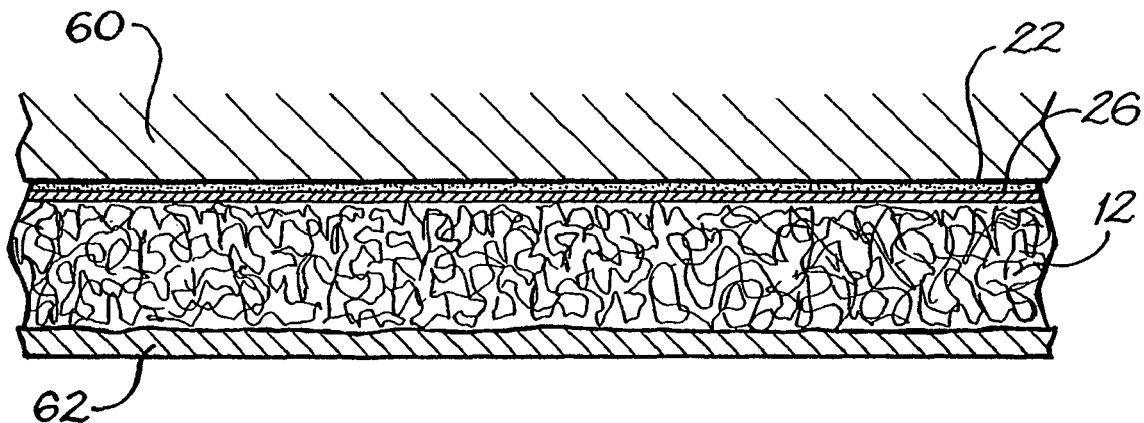
FIG. 6 shows the second embodiment applied to a ceiling.
Figure 7:
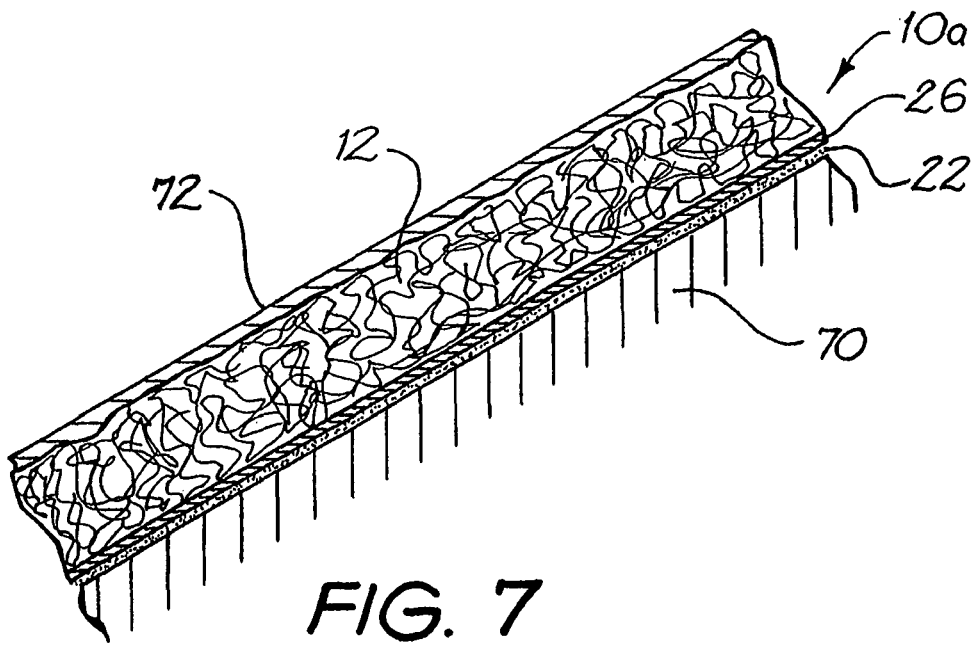
FIG. 7 shows the second embodiment applied to a roof.

FIGS. 5 to 7 illustrate other uses of the coverings of FIGS. 2 and 3.

In particular, FIG. 5 shows the covering 10a applied to a floor 50 which may be a concrete slab, or timber, plywood or particleboard floor. The peel-off layer 24 is removed and the foil 26 stuck to the surface of the floor. A floor surface is then applied over the top of the blanket. The floor surface could be tiles 52 in which case they are stuck to a layer of tiling cement or grout 54 applied to the blanket which is absorbed by the blanket and penetrates to the foil layer. Alternatively, if a timber floor surface (not shown) is to be provided, the timber surface is applied over an adhesive which has been pressed into the blanket leaving some glue remaining on the surface of the blanket the surface glue provides adhesion to the timber flooring which absorbs the glue and becomes impregnated with it to form a flexible gel that supports and adheres to the proposed flooring. The covering, as well as covering imperfections in the door and providing a smooth surface for the application of tiles/timber also provides substantially improved heat and sound insulation. When used for a floor the covering 10a has a preferred thickness of 2 to 10 mm, most preferably 2 to 5 mm, and the gaps in the blanket are 0.3 mm to 3 mm, most preferably 0.6 mm to 3 mm.

The mesh of FIG. 3 may be applied to a floor in the same way as the covering 10a, as described above. Where the mesh of FIG. 3 is applied to a floor, the spacing between the strands is 5 mm to 20 mm, preferably 5 mm to 10 mm. The thickness of the mesh is 1 mm to 4 mm, most preferably 1 mm to 2 mm.

FIG. 6 illustrates the covering 10a applied to a ceiling 60 which may typically be plasterboard or the like. Again the peel-off layer is removed and the covering is simply stuck to the ceiling. The covering covers any cracks or holes. The blanket is then painted typically with an acrylic or other paint 62, rather than an acrylic render paint. The metallic reflective foil layer and blanket provide heat insulation, and the blanket sound insulation. When used for a exiling the covering 10a has a preferred thickness of 2 to 10 mm, most preferably 2 to 5 mm, and the gaps in the blanket are 0.3 mm to 3 mm most preferably 0.6 mm to 3 mm.

The mesh of FIG. 3 may be applied to a ceiling in the same way as the covering 10a, as described above. Where the mesh of FIG. 3 is applied to a ceiling, the spacing between the strands is 5 mm to 20 mm, preferably 5 mm to 10 mm. The thickness of the mesh is 1 mm to 4 mm, most preferably 1 mm to 2 mm.

FIG. 7 illustrates a yet further use for the covering 10a as a wrap for a roof structure, which in the described embodiment is the outer structural element 70 of a roof, typically a fibro sheet or sheet of plywood, but may be rafters or other roof members or structures before the application of tiles, corrugated steel or other external roof cladding material 72. The covering 10a may be quickly and safely applied to the planar base using the self-adhesive layer 26. The blanket layer will adsorb the adhesive which is used to glue the external roof cladding material 72 to the covering. The external roof cladding material may also be to the base layer using screws or the like. The blanket and foil provide sound and heat insulation. When used for a ceiling the covering 10a has a preferred thickness of 2 to 20 mm, most preferably 5 to 10 mm, and the gaps in the blanket are 0.3 mm to 3 mm, most preferably 0.6 mm to 3 mm.

The mesh of FIG. 3 may be applied to a roof in the same way as the covering 10a, as described above. Were the mesh of FIG. 3 is applied to a roof, the spacing between the stands is 5 mm to 20 mm, preferably 5 mm to 10 mm. The thickness of the mesh is 1 mm to 4 mm, most preferably 1 mm to 2 mm.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A multi-layer covering comprising:
    a laminate sheet adapted to cover an object surface, such as a surface of a building or other solid object and to support an applied coating, the laminate sheet having:
        a fabric layer defining an outer surface of the multi-layer covering;
        a generally planar non-fabric backing layer bonded to an inner surface of the fabric layer and coextensive with the fabric layer;
        an adhesive disposed on an inner surface of the backing layer; and
        a removable protective layer covering the adhesive on the inner surface of the backing layer;
    wherein the protective layer is removable to allow the multi-layer covering to be adhered to and cover the object surface, such that the outer surface of the multi-layer covering provides a smooth outer surface for supporting the applied coating; and
    wherein the fabric layer is sufficiently porous to allow the applied coating to penetrate to the backing layer and the backing layer has a series of through holes adapted to allow the applied coating to penetrate through the backing layer to the object surface.

2. A multi-layer covering as claimed in claim 1 wherein the holes in the backing layer comprise a grid of blister holes punched through the backing layer.

3. A multi-layer covering as claimed in claim 2 wherein the holes have a diameter of 0.5 mm to 10 mm and the holes are spaced apart by 10 mm to 300 mm.

4. A multi-layer covering as claimed in claim 3 wherein the holes have a diameter of 0.6 mm to 5 mm and the holes are spaced apart by 10 mm to 50 mm.

5. A multi-layer covering as claimed in claim 1 wherein a grid of through holes is defined in at least the backing layer and the fabric layer.

6. A multi-layer covering as claimed in claim 5 wherein the holes have a diameter of 0.5 mm to 10 mm and the holes are spaced apart by 10 mm to 300 mm.

7. A multi-layer covering as claimed in claim 6 wherein the holes have a diameter of 0.6 mm to 5 mm and the holes are spaced apart by 10 mm to 50 mm.

8. A multi-layer covering as claimed in claim 1 wherein the fabric layer is formed from a woven fabric having a thickness from 2 mm to 20 mm, the woven fabric being made from fibres or strands and wherein either gaps between fibres in the woven fabric are defined in the range of 0.3 mm to 3.0 mm or holes having a diameter of 0.3 mm to 3.0 mm are formed in the woven fabric.

9. A multi-layer covering as claimed in claim 8 wherein the fabric layer has a thickness of 2 mm to 5 mm.

10. A multi-layer covering as claimed in claim 1 wherein the fabric layer is a flexible mesh layer that defines a spacing between strands of the mesh of 3 mm to 20 mm.

11. A multi-layer covering as claimed in claim 1 wherein the fabric layer is a non-woven fabric, such as a batt, having a thickness from 2 mm to 20 mm, the non-woven fabric being made from fibres or strands and wherein either gaps between fibres or strands in the non-woven fabric are defined in the range of 0.3 mm to 3.0 mm or holes having a diameter of 0.3 mm to 3.0 mm are formed in the non-woven fabric.

12. A multi-layer covering as claimed in claim 1 wherein the fabric layer is made from a plastics material such as fibre glass or PET fibres.

13. A multi-layer covering as claimed in claim 1 wherein the backing layer is a metallic reflective foil.

14. A multi-layer covering as claimed in claim 1 wherein the backing layer includes a metallic reflective foil and building paper.

15. A multi-layer covering as claimed in claim 1 wherein the backing layer is a building paper.

16. A multi-layer covering as claimed in claim 1 wherein the backing layer includes two metallic reflective foils sandwiching a sheet of building paper.

17. A method of treating an object surface such as a wall, ceiling, roof, or floor comprising the steps of:
    providing a multi-layer covering comprising a laminate sheet, the laminate sheet including:
        a porous fabric layer defining an outer surface of the multi-layer covering;
        a generally planar non-fabric backing layer having a series of through holes, the backing layer being bonded to an inner surface of the fabric layer and coextensive with the fabric layer;
        an adhesive disposed on an inner surface of the backing layer; and
        a removable protective layer covering the adhesive on the inner surface of the backing layer;

removing the removable protective layer of the multi-layer covering;

applying the multi-layer covering to the object surface, using the adhesive to retain the multi-layer covering in position, so that substantially all of the object surface is covered by both the fabric layer and the backing layer and so that the outer surface of the multi-layer covering provides a smooth outer surface; and applying one or more coatings to the smooth outer surface of the multi-layer covering, such that the applied coating penetrates through the fabric layer and through the holes of the backing layer to the object surface.

18. A method as claimed in claim 17 wherein the step of applying one or more coatings comprises applying one or more coatings of acrylic render or paint.

19. A method as claimed in claim 17 wherein the multi-layer covering is applied to a wall and the coating is a render or paint applied with a brush, roller, or spray gun.

20. A method as claimed in claim 18 wherein the coating includes cement and/or sand particles and an acrylic polymer binder and wherein the sand and cement particles are sufficiently small to penetrate into the gaps between the fibres of the fabric layer and the holes in the backing layer to reach the object surface so that the covering is saturated with acrylic render or paint.

21. A method as claimed in claim 17 wherein the covering is applied to a roof and the coating is an adhesive or sealant.

22. A method as claimed in claim 17 wherein the covering is applied to a floor and the coating is tiling cement, grout, or adhesive.

* * * * *

UNITED STATES PATENT AND TRADEMARK OFFICE
CERTIFICATE OF CORRECTION

PATENT NO. : 7,784,236 B2  
APPLICATION NO. : 10/563026  
DATED : August 31, 2010  
INVENTOR(S) : Owen Derek Barr Page 1 of 1

It is certified that error appears in the above-identified patent and that said Letters Patent is hereby corrected as shown below:

Title Page, Item (57):

Please replace the Abstract with the following:

-- A multi-layer covering (10) that sticks to solid surfaces (28) and supports an applied coating of render or paint. The covering (10) includes an outer fabric layer (12) bonded to a backing layer (26), with an adhesive layer (22) placed on the backing layer (26) surface opposite the fabric layer (12), and a peel-off layer (24) which protects this adhesive layer (22). This adhesive layer (22) allows the ease of application of the covering (10) to a surface (28). The fabric layer (12), selected from a woven- fabric, or batt, or mesh, is porous to allow coatings to penetrate through. The backing layer (26), which can be a metallic reflective foil or paper, has holes (29) throughout to allow penetration of the coating to the solid surface (28). The covering (10) may be applied to walls, ceilings, floors and roofs where different coatings may be applied. The covering (10) may be used to cover cracks and undulations in a surface (28). --.

IN THE SPECIFICATION:

Column 3, Line 29, delete "struggle" and substitute therefore -- structure --.

Signed and Sealed this  
Seventh Day of February, 2012

David J. Kappos  
*Director of the United States Patent and Trademark Office*